(12) United States Patent
Benson et al.

(10) Patent No.: US 9,749,355 B1
(45) Date of Patent: Aug. 29, 2017

(54) NETWORK PACKET PRIORITIZATION

(71) Applicant: Amazon Technologies, Inc., Seattle, WA (US)

(72) Inventors: Bryan Mark Benson, Seattle, WA (US); Michael F. Diggins, Seattle, WA (US); David Dongyi Lu, Seattle, WA (US); Xingbo Wang, Kirkland, WA (US); Colm MacCarthaigh, Seattle, WA (US); Anshul Saxena, Uttar Pradesh (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/668,432

(22) Filed: Mar. 25, 2015

(51) Int. Cl.
*H04L 29/06* (2006.01)

(52) U.S. Cl.
CPC .............................. *H04L 63/1458* (2013.01)

(58) Field of Classification Search
CPC .................................................. H04L 63/1458
See application file for complete search history.

(56) References Cited

U.S. PATENT DOCUMENTS

| | | | | |
|---|---|---|---|---|
| 7,331,060 B1* | 2/2008 | Ricciulli | ............. | H04L 63/1458 709/227 |
| 2004/0250124 A1* | 12/2004 | Chesla | ................. | G06F 21/552 726/13 |
| 2012/0079592 A1* | 3/2012 | Pandrangi | ............... | H04L 47/10 726/22 |
| 2013/0107729 A1* | 5/2013 | Wagner | ............... | H04L 43/0882 370/252 |

OTHER PUBLICATIONS

Lin et al., (Using Adaptive Bandwidth Allocation Approach to Defend DDoS Attacks, 2008 IEEE, pp. 176-181).*

\* cited by examiner

*Primary Examiner* — Oleg Korsak
(74) *Attorney, Agent, or Firm* — Thorpe North & Western LLP (57) ABSTRACT

A technology is described for prioritizing network packets using suspicion weights assigned to packet attributes of the network packets. An example method may include analyzing a network packet for packet attributes that have values indicating that the network packet may be associated with a potential network attack. Suspicion weights for the packet attributes identified as having a value that indicates that the network packet is associated with the potential network attack may be obtained, and a suspicion score may be calculated for the network packet using the suspicion weights.

19 Claims, 8 Drawing Sheets

NETWORK PACKET PRIORITIZATION

BACKGROUND

Computing service systems in computing service environments are often targets for malicious attacks conducted over a computing network. These malicious attacks can potentially cause a targeted computing service system to be affected to a point that physical hosts included in the computing service system are unable to respond to legitimate network requests. For example, a DDoS (Distributed Denial of Service) attack may be a type of malicious attack that distributes a DoS (Denial of Service) program among several computing devices that in turn flood a computing service system with network packets (e.g., SYN (synchronization) packets) to initiate a network connection. The flood of network packets may cause network performance to slow resulting in system unresponsiveness for the computing service system.

In the event of a malicious attack, computing service providers may have a difficult time separating non-malicious network traffic from malicious network traffic. For example, a DDoS attack may involve multiple computing devices sending requests to perform a network action to a target computing service system. Traffic shaping or packet analysis may be one technique used to mitigate a malicious attack.

DETAILED DESCRIPTION

A technology is described for prioritizing network packets such that network packets suspected of being associated with a network attack or potential network attack may be assigned a lower priority than network packets that are not suspected of being associated with the network attack. In one example configuration, the header of a network packet may be analyzed to identify packet attributes that have suspicious values. A network packet may include two categories of data, a header containing packet attribute data and user data (e.g., payload data). The packet header may include data used to verify and deliver a network packet's user data to an intended recipient of the network packet (e.g., a destination or source host).

In analyzing a header of a network packet, various packet attributes may be selected and the values of the packet attributes may be evaluated to determine whether the values indicate that the network packet may be associated with a potential computer network attack. For example, a packet attribute value may be suspicious when the value is a value that is atypical, unexpected, or is suspect (e.g., due to an association with a suspicious host or due to an incorrect configuration by an attacker). As an illustration, a packet attribute may contain a sequence number value that may be generated by a source host. It may be expected that the sequence number may be some range of values typically generated by the source host (e.g., "1293906976", "3455719727", etc.). In the case that the sequence number is a value that is not expected (e.g., the value is "0", "1", or some other value), then the sequence number value may be considered suspicious.

The various packet attributes selected for analysis may be assigned a suspicion weight. A suspicion weight may be weighted according to the suspiciousness of a packet attribute value. For example, a rarely occurring packet attribute value may be weighted more heavily than a more commonly occurring packet attribute value. The suspicion weights assigned to the packet attributes may then be used to calculate a suspicion score for the network packet, and the suspicion score may then be used to deprioritize suspicious network packets (or conversely prioritize non-suspicious network packets) as a result of network bandwidth capacity being limited or overloaded.

Separating the non-malicious network traffic from the malicious network traffic may be difficult, at least in the respect that although packet attribute values included in a network packet may be unexpected or suspect, the values may be technically valid according to the network protocol being used. As such, classifying a network packet as being malicious based on a single unexpected packet attribute value may result in the misclassification of legitimate network packets. As a result, multiple packet attributes for a network packet may be analyzed and suspicion weights associated with the packet attributes and values analyzed may be used to calculate a suspicion score for the network packet in the present technology. The suspicion score may be used to deprioritize suspicious network packets (or prioritize likely legitimate or non-malicious network packets) during times that network bandwidth may be overloaded. As such, legitimate network packets may be less likely to be identified as suspicious and dropped when computer network bandwidth is limited.

Figure 1:
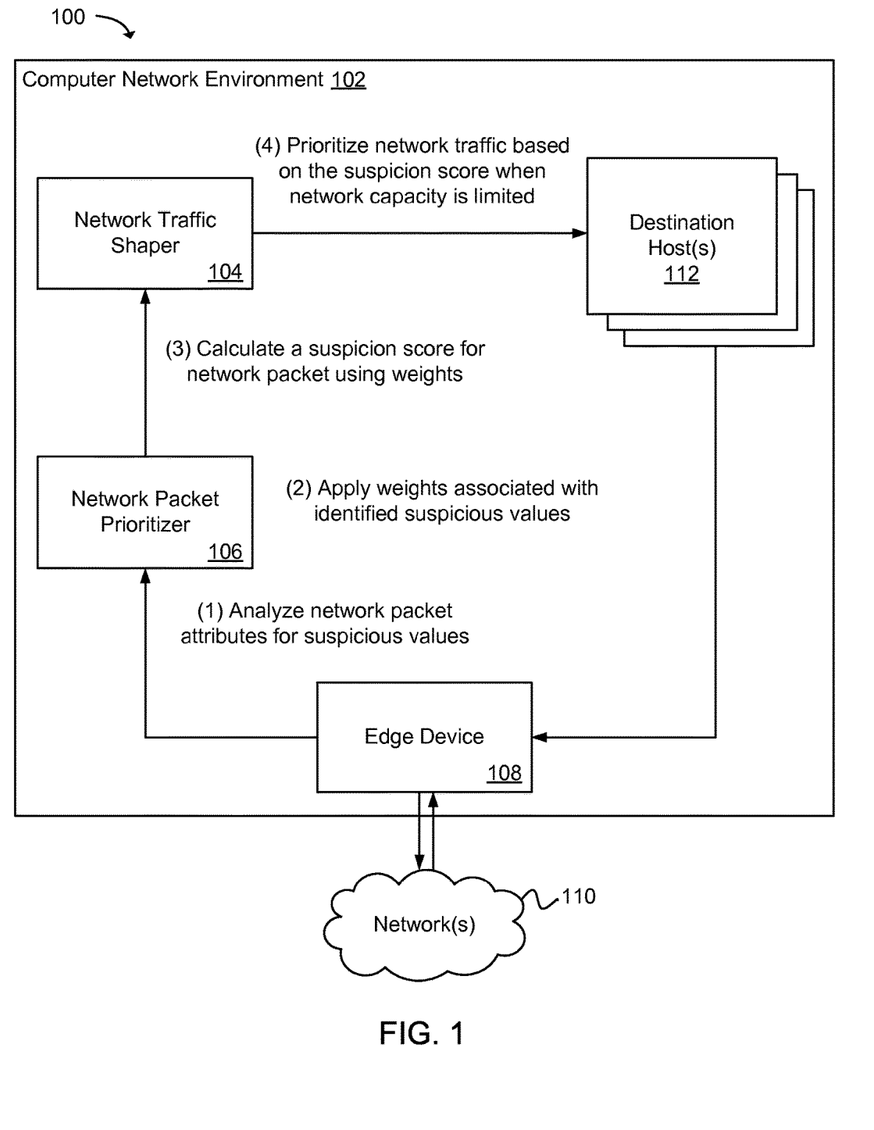
FIG. 1 is a block diagram illustrating an example system for prioritizing network packets using suspicion weights associated with packet attributes of the network packets.

FIG. 1 is a block diagram illustrating a high level example of a system 100 for prioritizing network packets using suspicion weights. As illustrated, the system 100 may include a network packet prioritizer 106 and a network traffic shaper 104 located within a computer network environment 102 (e.g., that includes a physical computer network and/or a virtual computer network). The network packet prioritizer 106 and the traffic shaper 104 may be hosted by one or more server computers, computing instances (e.g., virtual computers) or network devices. The computer network environment 102 may include a number of destination hosts 112 (e.g., servers). Network traffic transmitted from one or more networks 110 to the computer network environment 102 may be intended for the destination hosts 112.

In one example configuration, network traffic may be received at an edge device 108 (e.g., a network router, switch, gateway, or other network device that provides an entry point into a computer network) and routed to the network packet prioritizer 106. The network packet prioritizer 106 may be configured to analyze the values of packet attributes included in the header of a network packet and identify suspicion weights for the packet attributes according to the values of the packet attributes. Network packets analyzed using the packet prioritizer 106 may include Internet Protocol ("IP") packets implementing any communication protocol included in the IP suite (e.g., Transmission Control Protocol ("TCP"), User Datagram Protocol ("UDP"), Internet Control Message Protocol ("ICMP"), Domain Name System ("DNS"), Hypertext Transmission Protocol ("HTTP"), etc.). Other network protocols may also be analyzed (e.g., IPX/SPX (Internetwork Packet Exchange/Sequenced Packet Exchange), NetBeui, etc.). Packet attributes included in the header of a network packet may include: routing information (e.g., source host and destination host information), communication protocol information, verification information, or other types of information included in a network packet header. Examples of packet attributes may include, but are not limited to: a source IP field, an internet header length field, source IP port field, packet length field, sequence number field, checksum field, window size field, as well as any other packet attribute.

In one example, the network packet prioritizer 106 may be configured to analyze preselected packet attributes of network packets passing through the network packet prioritizer 106. Preselected packet attributes may be packet attributes that have been identified as having a history of including suspicious values that may be associated with potential computer network attacks (e.g., a DDos attack). For example, rather than analyzing every packet attribute included in the header of a network packet, those packet attributes that are most likely to have a suspicious value may be preselected for analysis. Selecting which packet attributes to analyze may be performed during operation or offline (e.g., non-production) by analyzing historical network data to identify packet attributes that in the past have included suspicious values. Those packet attributes identified as having had suspicious values may be provided to the network packet prioritizer 106 for use in analyzing network packets. In addition, machine learning algorithms may be used to perform such analysis so that the results are updated over time on a dynamic basis and more accurately reflect the probability of a packet attribute containing a suspicious value.

Analysis of historical network packet data may result in a determination that the value of a packet attribute may have been set by an attacker. For example, an attacker may create network packets that are used in a computer network attack. In creating the network packets, the attacker may statically set one or more packet attributes, whereas values of packet attributes associated with legitimate network packets may be set using an algorithm utilized by an operating system that creates the network packets. As an illustration, TCP network packets have a sequence number field that is used to ensure sequenced delivery of network packets to a destination host. When the TCP network packets are created, the value of the sequence number field is generated by an operating system on the source host. Different operating systems may utilize different algorithms to generate a sequence field value. As a result, the value of the sequence number field in network packets originating from different source hosts may have different formats. As such, any sequence number field value included in a network packet may be acceptable, but some values may indicate that the value has been statically set rather than having been generated using an algorithm. As an illustration, the format of a sequence number field value generated by an algorithm utilized by an operating system may resemble something like "1293906975", whereas the format of a sequence number field value statically set by an attacker may be something like "0" or "1". Although a sequence number field value of "0" may be an acceptable value according to the Transmission Control Protocol, the value raises a suspicion that the value may have been set by an attacker.

The network packet prioritizer 106 may be configured to assign suspicion weights to a network packet according to the suspicion level of packet attribute values (e.g., a suspicion level that a packet attribute value may be associated with a network packet created for use in a computer network attack). For example, packet attributes of a network packet may be analyzed for values that may be associated with a potential computer network attack and suspicion weights for each of the packet attributes may be obtained for use in calculating a suspicion score for the network packet. As an illustration, a first packet attribute, a second packet attribute and a third packet attribute for a network packet may be analyzed and suspicion weights associated with each of the first, second and third packet attributes and values of the first, second and third packet attributes may be obtained (e.g., from a table stored in computer memory or a data store). The suspicion weights may be weighted based on the suspicion level of a packet attribute value. For example, a suspicion weight for a packet attribute value that is highly suspicious may receive a greater weighting than a suspicion weight for a packet attribute value that is somewhat suspicious.

A suspicion score may be calculated for a network packet using the suspicion weights associated with the packet attributes and values. In one example, the suspicion weights may be summed to produce the suspicion score, although any type of calculation may be used to calculate a suspicion score (e.g., multiplication, an algebraic formula, a logarithmic formula, etc.). As an illustration, N number of packet attributes for a network packet may have been analyzed resulting in N suspicion weights having been obtained for the network packet. The suspicion weights may be aggregated to produce a suspicion score for the network packet. In addition, the suspicion score may take into account the existence of a particular combination of suspicious packet attributes to increase the suspicion score further (e.g., the existence of suspicious attribute X and suspicious attribute Y together indicates a higher likelihood of attack than typical aggregation of individual attributes).

Network packets that have received a suspicion score may be forwarded to the network traffic shaper 104. The network traffic shaper 104 may be configured to forward network packets to destination hosts 112 according to available capacity for a computer network to handle transmission of network packets and the suspicion score of the network packets. For example, when network capacity may be limited or overloaded, network packets may be forwarded to a destination host 112 based on network capacity that may be available to handle network traffic associated with the network packets. As a result, network packets that have a suspicion score representing a higher priority may be forwarded to an intended destination host 112 as permitted by available network capacity to handle any resulting network traffic associated with the network packets, whereas network packets having a suspicion score representing a lower priority may be dropped due to insufficient network capacity or destination host 112 capacity available to handle resulting network traffic.

As another example, a determination of capacity that may be available to transmit network packets to respective destination hosts 112 may be based on an attribute of network capacity (e.g., capacity to transmit TCP packets, DNS packets, UDP packets, etc.). For example, a network packet of a particular network packet type may be deprioritized when network capacity to transmit network packets of the network packet type may be limited and the suspicion score for the network packet represents a lower priority. As an illustration, one attribute of network capacity that may be used when determining network capacity may be a network's ability to process TCP SYN packets. When the network's ability to process SYN packets becomes limited or overloaded, SYN packets having a suspicion score representing a lower priority may be dropped.

As an illustration of the present technology, network packets received at an edge device 108 may be forwarded to the network packet prioritizer 106 that analyzes the packet attributes of the network packets for suspicious values. More specifically, a number of packet attributes for a network packet may be analyzed to determine whether the values of the packet attributes may be values indicating that the network packet may be associated with a potential attack on the computer network. In analyzing the values of the packet attributes, preassigned suspicion weights associated with the packet attributes and packet attribute values may be obtained from computer memory and the suspicion weights may be used to calculate a suspicion score for the network packet.

Having received a suspicion score, the network packets may be forwarded to the network traffic shaper 104 where the suspicion score of a network packet may be used to prioritize the transmission of the network packet to a destination host 112 based on available network capacity. As such, the network traffic shaper 104 may be configured to periodically determine available network capacity for the computer network and then prioritize the network packets according to the suspicion scores of the network packets and the available network capacity. In the event that the available network capacity may be insufficient to handle network traffic related to the network packets, those network packets having suspicion scores that represent a lower priority may be dropped.

In one example, the network traffic shaper 104 may include priority buckets that may be used to prioritize the transmission of network packets to destination hosts 112. Network packets may be placed in a priority buckets according to the value of a network packets suspicion score. As an illustration, network packets having a suspicion score between "0" and "99" may be placed a first priority bucket. Network packets having a suspicion score between "100" and "199" may be placed a second priority bucket, and so on. Those network packets placed in the first priority bucket may receive first priority in being transmitted to destination hosts 112, and network packets placed in the second priority bucket may receive second priority in being transmitted to destination hosts 112.

Figure 2:
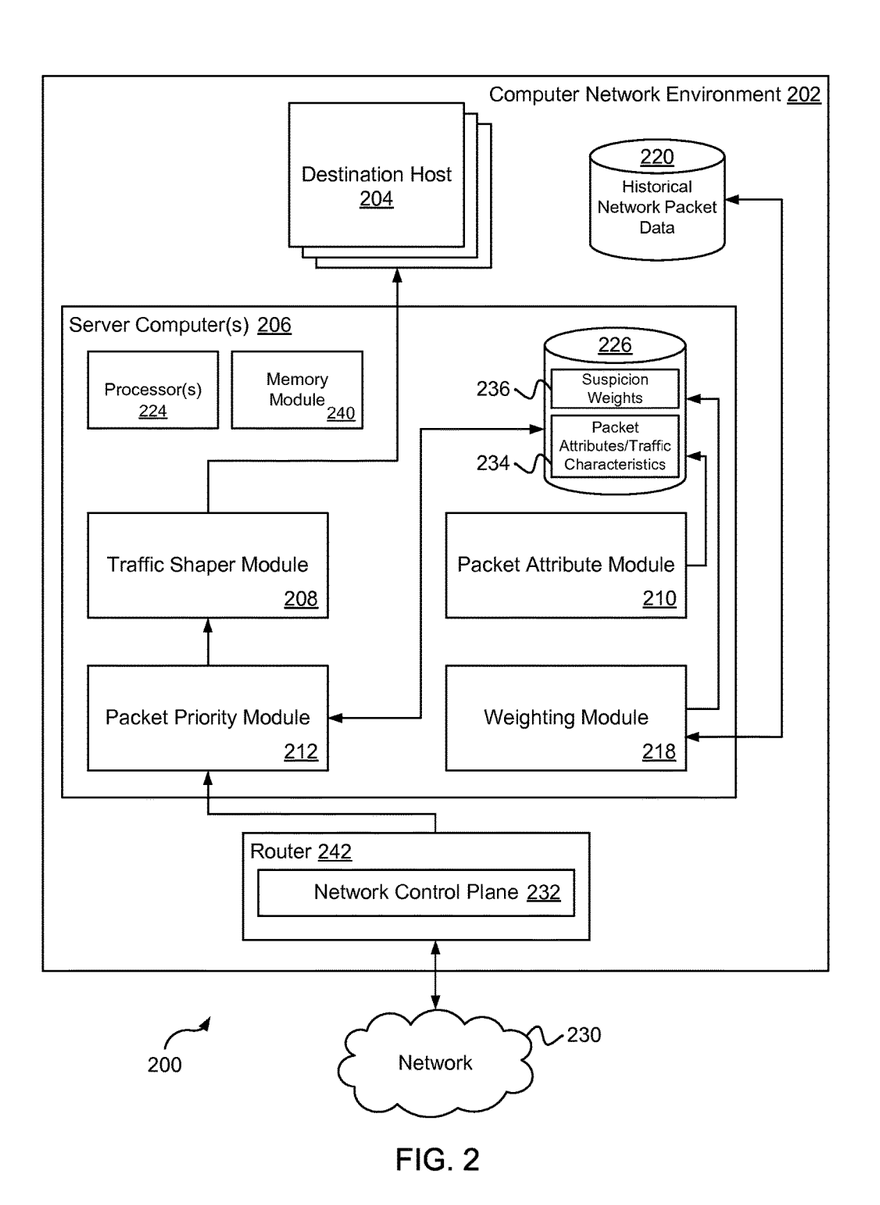
FIG. 2 is a block diagram that illustrates various example components included in a system for prioritizing network packets.

FIG. 2 illustrates components of an example system 200 on which the present technology may be executed. The system 200 may include a computer network environment 202 that includes one or more server computers 206 and one or more destination hosts 204. The computer network environment may be a Local Area Network "LAN", Wide Area Network "WAN", Enterprise Area Network "EPN", Wireless Area Network "WAN", or other types computing network. The server computers 206 may include a number of modules used to prioritize network traffic transmitted to the computer network environment 202 from external networks 230. The modules included in the server computer 206 may include a packet priority module 212, a traffic shaper module 208, a weighting module 218 and a packet attribute module 210. For the purpose of simplicity, the various modules are illustrated as being located on one server computer 206. However, the modules may be hosted by separate server computers and/or virtual computers within a computing services environment.

In one example, the system 200 may be configured to prioritize network packets according to the suspiciousness of network packet attribute values. In another example configuration, prioritization of network packets may be performed according to the suspiciousness of network traffic characteristics. In the first example configuration, the packet priority module 212 may be configured to analyze network packets for packet attributes that have values indicating that the network packets may be associated with a potential network attack. For example, a network packet transmitted via an external computer network 230 to the computer network environment 202 may be forwarded by a router 242 to the packet priority module 212, which may be configured to analyze the packet attributes of the network packet for suspicious values.

Selected packet attributes, in one example, may be analyzed for packet attribute values that indicate that a network packet may be associated with a network attack or potential network attack. Those packet attributes selected for analysis may have been identified as sometimes having values that are atypical (e.g., a value that may meet communication protocol standards, but may not be a typical value for the packet attribute). Selecting packet attributes to analyze may be performed using the packet attribute module 210, which may be configured to perform offline analysis of historical network packet data to identify packet attributes that may have had suspicious values. Illustratively, historical network packet data 220 may be obtained from a data store and analyzed to identify packet attributes that have suspicious values. Identifiers for packet attributes 234 that are identified as sometimes having suspicious values may be stored in a memory device (e.g., a data store 226) that may be accessible to the packet priority module 212, such that the identifiers may be retrieved from the memory device and used to identify packet attributes in a network packet that is being analyzed using the packet priority module 212.

Alternatively, each packet attribute of a network packet may be analyzed for suspicious values. Illustratively, offline analysis of packet attributes may be performed to determine which values and/or value formats are typical or atypical for the packet attributes. The packet priority module 212 may then be configured to analyze each packet attribute of a network packet to identify values that do not conform to expected values and/or formats.

In analyzing the packet attributes of a network packet, the packet priority module 212 may be configured to obtain suspicion weights 236 associated with the packet attributes and calculate suspicion scores for the network packets. The suspicion weights 236 may be weighted according to the likelihood that the value of a packet attribute is a value associated with a potential computer network attack. As illustrated, a weighting module 218 may be included in the server computer 206 that may be configured to determine suspicion weights 236 for values of packet attributes and store the suspicion weights 236 for use by the packet priority module 212.

In one example, the weighting module 218 may be configured to analyze historical network packets obtained from a data store 220 containing historical network packet data and determine a number of occurrences that a suspect value in a selected packet attribute occurs over the historical network packets. The weight of a suspicion weight 236 may then be set based on the number of occurrences of the suspect value. For example, a suspicion weight 236 may be obtained for a selected packet attribute, where the suspicion weight 236 may be inversely proportional to the number of occurrences of the value of the selected packet attribute in the historical network packets. Making suspicion weights 236 inversely proportional to the occurrence of a suspicious value reflects that rarely occurring values are more likely to be associated with a computer network attack as compared to commonly occurring values.

Illustratively, inversely proportional suspicion weights 236 may be weighted by selecting a packet attribute in historical network packets for analysis to determine how often a particular suspicious value and/or value format occurs within the historical network packets, and a suspicion weight 236 may be assigned that reflects how often the suspicious value occurs in the historical network packets. As a more specific example, a UDP checksum field in historical network packets may be analyzed to determine how often the UDP checksum field has a value of zero. A UDP checksum value of zero may be suspicious because a UDP checksum field may typically contain a value greater than zero. In the case that the UDP checksum field contains the value zero in 1 out of every 50 network packets in the historical network packets, then the suspicion weight 236 assigned to a UDP checksum field with a value of zero may be "50". As another specific example, the sequence number field in historical network packets may be analyzed as described above. In the case that the sequence number field contains the value zero in 1 out of every 100,000 network packets in the historical network packets, then the suspicion weight 236 assigned to the sequence number field with a value of zero may be "100,000". The following table provides an example of suspicion weights 236 assigned to a packet attribute according to an occurrence of a value of the packet attribute in historical network packets.

| PACKET ATTRIBUTE | |
| --- | --- |
| Value | Suspicion Weight |
| X (1 in 50 network packets) | 50 |
| Y (1 in 100,000 network packets) | 100,000 |
| Z (1 in 30,000 network packets) | 30,000 |

In another example, a suspicion weight 236 may be weighted based on the suspiciousness of a packet attribute value (e.g., according to a likelihood that the suspicious value may be a result of the network packet being constructed for use in an attack on a computer network). For example, values of a packet attribute may be ranked according to a suspiciousness ranking of the values and a weight corresponding to the ranking may be assigned. The weight of the suspicion weight 236 may be stored in the data store 226 or memory module 240, making the suspicion weight 236 available to the packet priority module 212.

In yet another example, a suspicion weight 236 for a packet attribute may be determined dynamically by collecting a suspicion value history for network packets transmitted to a destination host 204 during a moving time window. The time window may comprise a "now time" through to a preselected time in the past (e.g., one month ago through to now). The suspicion value history may be analyzed to determine an occurrence of a suspicious value for a packet attribute during the time period of the suspicion value history, and a suspicion weight 236 may be assigned to the packet attribute according to the occurrence of the suspicious value. As an illustration, a packet histogram may be constructed by collecting a suspicion value history for a current flow of network packets over a period of time. The packet histogram may show an occurrence of a suspicious value in a packet attribute during the period of time represented in the packet histogram. A suspicion weight 236 may be assigned based on the number of occurrences of a suspicious value in the packet histogram. In some examples, a suspicion value history may be analyzed using a machine learning model that outputs a suspicion weight 236 based on an occurrence of a suspicious value for a packet attribute during a time period of the suspicion value history.

Having determined suspicion weights 236 for packet attributes, the weighting module 218 may be configured to store the suspicion weights 236 to a data store 226 or a memory module 240 that is accessible to the packet priority module 212. In analyzing a particular packet attribute, the packet priority module 212 may, in one example, be configured to evaluate the value of the packet attribute by determining whether the value is associated with a suspicion weight 236 stored in memory. In the event that a suspicion weight 236 is identified for the packet attribute, the suspicion weight 236 may be retrieved and used to calculate a suspicion score for a network packet associated with the packet attribute. For example, suspicion weights 236 identified for a network packet may be summed to produce a suspicion score for the network packet. As such, the suspicion score for a network packet may reflect the overall suspiciousness of the network packet as being associated with a malicious network attack. The network packet and the suspicion score may then be transmitted to the traffic shaper module 208, as will be described later.

In the second example configuration of the packet priority module 212, network packets may be analyzed for suspicious network traffic characteristics indicating that the network packets may be associated with a network attack (as opposed to analyzing packet attributes as described above). The network packets may be prioritized according to the suspiciousness of the network traffic characteristics. Suspicious network traffic characteristics may be characteristics exhibited by network traffic (e.g., as collected from individual network packets) that vary with the percentage of network traffic, where the characteristics raise a suspicion that the network traffic characteristics are associated with a computer network attack. For example, suspicious network traffic characteristics may include: source IP addresses associated with a large percentage of network traffic, unexpected Time To Live ("TTL") values, high traffic targeting of a destination host, as well as other network traffic characteristics that may be associated with malicious network activity.

Network packets exhibiting one or more suspicious network traffic characteristics may receive a suspicion score calculated using suspicion weights 236 that have been assigned to the suspicious network traffic characteristics. In one example, the packet attribute module 210 may be configured to analyze historical network packets to identify suspicious network traffic characteristics that may be related to computer network attacks and store the network traffic characteristics 234 in the data store 226 or the memory module 240. In another example, current network traffic metrics may be collected and analyzed to identify network traffic characteristics that may be suspicious or have been previously identified as suspicious.

The weighting module 218 may be configured to assign suspicion weights 236 to suspicious network traffic characteristics. In one example, suspicion weights 236 may be assigned by ranking a particular suspicious network traffic characteristic and assigning a suspicion weight 236 based on the ranking. As a non-limiting example, source IP addresses may be ranked according to a percentage of network traffic that the source IP address accounts for and a calculation can be made that subtracts the ranking from a base value. As an illustration, a source IP address that accounts for a large percentage of network traffic may receive the top ranking of "1". The ranking "1" of the top ranked source IP address may be subtracted from a base value of "1000" resulting in a weight of "999", whereas a lower ranked source IP address that may account for a lower percentage of network traffic may receive a ranking of "350" that may be subtracted from the base value of "1000" resulting in a weight of "650". The suspicion weights 236 may be stored in the data store 226 or the memory module 240 so that the suspicion weights 236 are accessible to the packet priority module 212. The example above provides one example of assigning suspicion weights 236 to suspicious network traffic characteristics, other methods of assigning suspicion weights 236 to suspicious network traffic characteristics are also within the scope of this disclosure.

The packet priority module 212 may be configured to obtain the suspicion weights 236 for suspicious network traffic characteristics identified as being included in a network packet from the data store 226 or a data store. The suspicion weights may then be used to calculate a suspicion score for the network packet as described earlier (e.g., sum the suspicion weights to produce a suspicion score). The network packet may then be transmitted to the traffic shaper module 208 along with the suspicion score assigned to the network packet.

The traffic shaper module 208 may be configured to deprioritize suspicious network packets when network bandwidth capacity and/or processing capacity are limited or overloaded. For example, network packets may be treated equally when sufficient network bandwidth capacity and/or processing capacity are available to handle network traffic associated with the network packets. However, when network bandwidth capacity and/or processing capacity becomes limited or overloaded, network packets assigned suspicion scores that represent a lower priority as compared to the suspicion scores of other network packets may be deprioritized and dropped as a result of insufficient network bandwidth capacity and/or processing capacity to handle network traffic associated with the network packets.

In one example, the traffic shaper module 208 may be configured to periodically query a network control plane 232 for available network bandwidth capacity information. In another example, network bandwidth capacity information may be regularly provided to the traffic shaper module 208 by the network control plane 232. In either case, as a result of a determination that the computer network may be overloaded, the number of network packets that are transmitted to destination hosts 204 may be limited to the network bandwidth capacity available to handle network traffic that results in the network packets reaching the intended destination hosts 204. The suspicion score assigned to the network packets may be used to determine which network packets are transmitted to destination hosts 204 and which network packets are dropped. More specifically, those network packets that have a suspicion score representing a higher priority are network packets deemed less suspicious and are transmitted to their destination hosts according to the available network bandwidth capacity. Those network packets that have a suspicion score representing a lower priority are network packets deemed more suspicious and are dropped where there is not enough available network bandwidth capacity.

In an alternative example, instead of dropping network packets that have a suspicion score representing a lower priority, network packets having suspicion scores that represent a lower priority may be buffered in computer memory for a short period of time (e.g., a period of time that does not exceed a timeout of a network packet). In the event that network bandwidth capacity for the computer network increases to a point that allows for the transmission of the network packets, the network packets may be transmitted to respective destination hosts 204.

The services and modules included in the server computer 206 and/or the components of the computer network environment 202 may be accessed using API calls, procedure calls or other network commands according to different technologies. The various processes and/or other functionality contained within the server computer 206 may be executed on the one or more processors 224 that are in communication with the one or more memory modules 240. The computer network environment 202 may include a number of server computers 206 that are arranged, for example, in one or more server banks or computer banks or other arrangements. The server computers 206 may support a computing environment using hypervisors, virtual machine monitors (VMMs) and other virtualization software. For purposes of convenience, the server computer 206 is referred to in the singular. However, it is understood that a plurality of server computers 206 may be employed in the various arrangements as described above.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
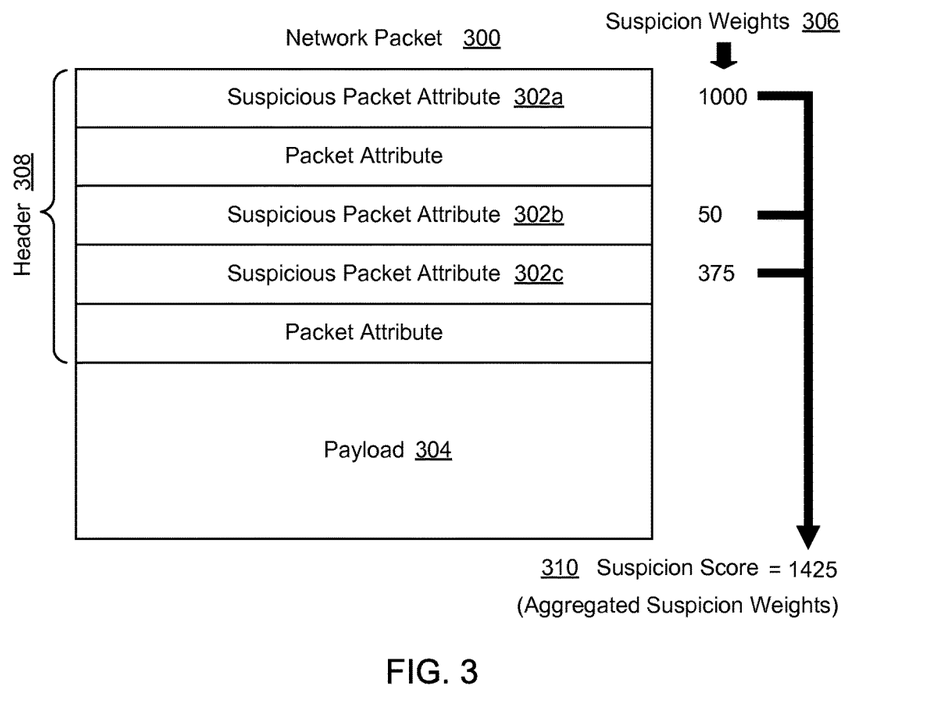
FIG. 3 is a diagram that illustrates an example network packet, suspicion weights and suspicion score for the network packet.

FIG. 3 is a diagram illustrating an example network packet 300. As illustrated, the network packet 300 includes a header 308 and a payload 304. The header 308 may be a header for any type of network packet (e.g., IP, TCP, UDP, etc.) and may include a number of packet attributes used to deliver the payload 304 to a destination host over a computer network. For example, the packet attributes included in the header 308 may include: source and destination network addresses, error detection codes, sequencing information, as well as other types of information.

As described earlier, an analysis of historical network packets may result in the identification of packet attributes that sometimes include atypical values. The atypical values may be indicative of network packets that are used in network attacks. Those packet attributes that occasionally include atypical values may be identified as suspicious packet attributes 302a-c and may be selected for analysis when a network packet is received at a destination computer network. Note, the labelling in FIG. 3 of "suspicious packet attributes 302a-c" indicates that those attributes have been determined to be suspicious by the system.

A suspicion weight 306 may be assigned to a suspicious packet attribute 302a-c according to the value of the suspicious packet attribute 302a-c. In one example configuration, a suspicion weight 306 assigned to a suspicious packet attribute 302a-c value may be determined offline by analyzing historical network packets to determine a number of occurrences of the suspicious packet attribute 302a-c value. As illustrated, a suspicion weight 306 assigned to the suspicious packet attribute 302a-c may be inversely proportional to the number of occurrences of the value of the suspicious packet attribute 302a-c in the historical network packets. As a result, a suspicious packet attribute 302a-c that has a low occurrence of a particular value may be assigned a greater suspicion weight 306 than a suspicious packet attribute 302a-c having a high occurrence of a particular value. The greater suspicion weight 306 may reflect that a rarely occurring suspicious packet attribute 302a-c value may be more suspicious than suspicious packet attribute 302a-c values that occur more often.

In analyzing the values of suspicious packet attributes 302a-c that have been selected for analysis, suspicion weights 306 associated with the values of the suspicious packet attributes 302a-c may be obtained (e.g., from computer memory or a data store) and used to calculate a suspicion score 310 for the network packet 300. For example, a process may parse the header 308 of the network packet 300 and read the value of a suspicious packet attribute 302a-c. The process may then query a computer memory or a data store for a suspicion weight 306 associated with the suspicious packet attribute 302a-c and the value of the suspicious packet attribute 302a-c. The process may be repeated for each suspicious packet attribute 302a-c selected for analysis in the network packet.

The suspicion weights 306 may then be used to calculate a suspicion score 310 for the network packet. As illustrated, calculating the suspicion score 310 for the network packet 300 may be performed by summing the suspicion weights 306 associated with the suspicious packet attributes 302a-c, although other methods of calculating the suspicion score 310 using the suspicion weights 306 may be used. As is described below, the suspicion score 310 for the network packet 300 may be provided as input to a traffic shaper that prioritizes network packets according to the suspicion score 310.

Figure 4:
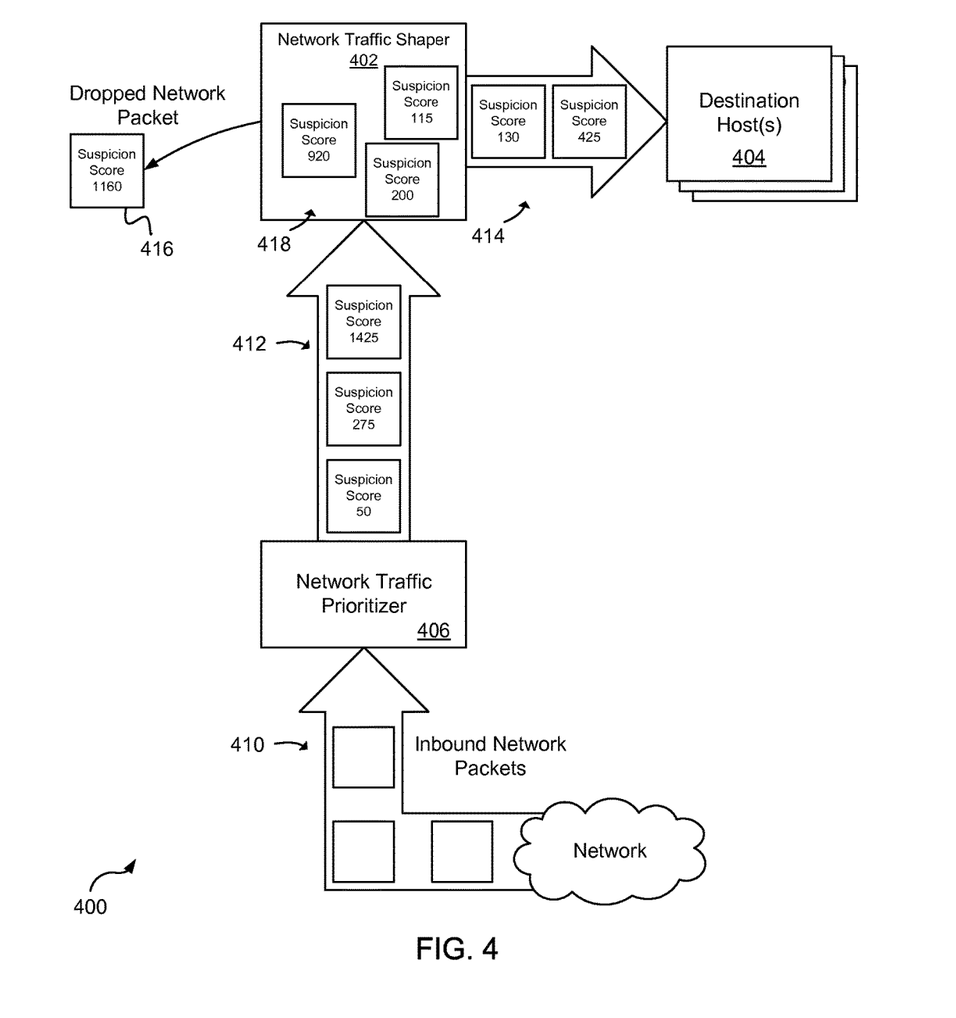
FIG. 4 is a block diagram illustrating an example system and method for prioritizing network packets.

Moving now to FIG. 4, a block diagram illustrates an example system 400 and method for prioritizing network packets. As described previously, inbound network packets 410 may be received from various source networks at a network traffic prioritizer 406 where the inbound network packets may be assigned suspicion scores. Network packets 412 that have received suspicion scores may then be forwarded to a network traffic shaper 402 configured to prioritize the network packets 412 as a result of a computer network being overloaded.

As described in relation to FIG. 3, the suspicion scores assigned to the network packets 412 may be inversely proportional to a number of occurrences of a suspicious value being detected in historical network packets. As a result, the value of a suspicion score may represent a suspiciousness that a network packet may be associated with a potential network attack. Namely, network packets 412 that have a higher suspicion score as compared to suspicion scores of other network packets may be more suspicious, meaning there may be a higher likelihood that the network packet with the higher suspicion score is associated with a network attack or a potential network attack.

Upon a determination that the computer network may be overloaded, the network traffic shaper 402 may begin to prioritize network packets 418 that have been forwarded to the network traffic shaper 402. Prioritization of the network packets 418 may be performed according to available network bandwidth capacity. As a simple illustration, in the event that available network bandwidth capacity allows for the transmission of two network packets to their respective destination hosts 404 and three network packets 418 arrive at the network traffic shaper 402, then the two network packets 414 that have lower suspicion scores as compared to the third network packet 416 may be selected for transmission to respective destination hosts 404, and the third network packet 416 may be dropped from the computer network.

Figure 5:
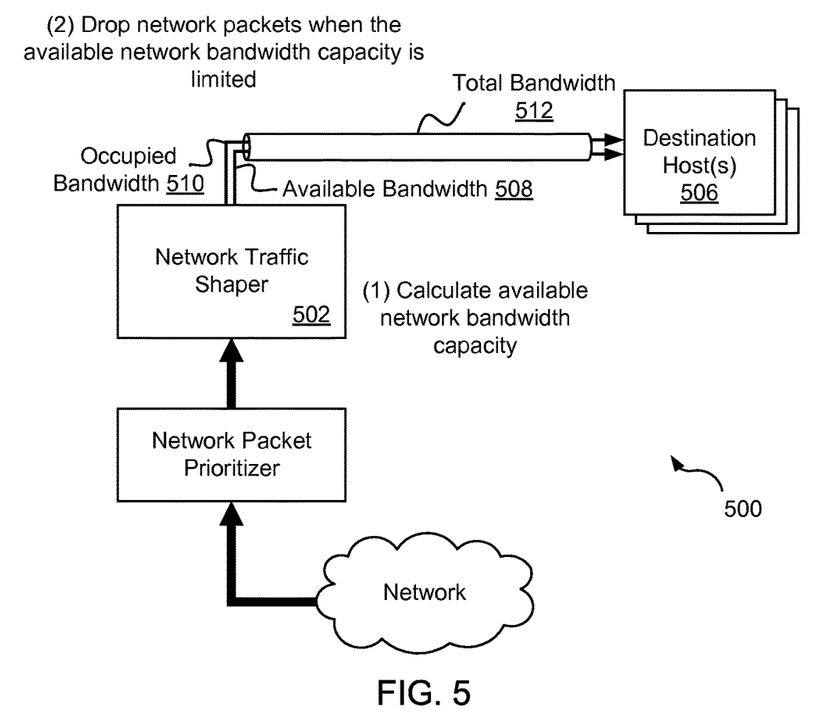
FIG. 5 is a block diagram that illustrates an example system and method for prioritizing network packets according to available network bandwidth capacity.

FIG. 5 is a block diagram that illustrates an example of a system 500 and method for prioritizing network packets according to available network bandwidth capacity. In configurations where available network bandwidth capacity for a computer network may be used to determine whether to drop suspicious network packets, a traffic shaper 502 may be configured to calculate available bandwidth 508 and drop lower priority network packets when the available bandwidth 508 is limited as described earlier. In one example, available bandwidth 508 for a computer network may be determined by identifying an amount of occupied bandwidth capacity 510 consumed by established network connections, and the occupied bandwidth capacity 510 may then be subtracted from a total bandwidth 512 representing a total amount of network bandwidth capacity for the computer network.

Figure 6:
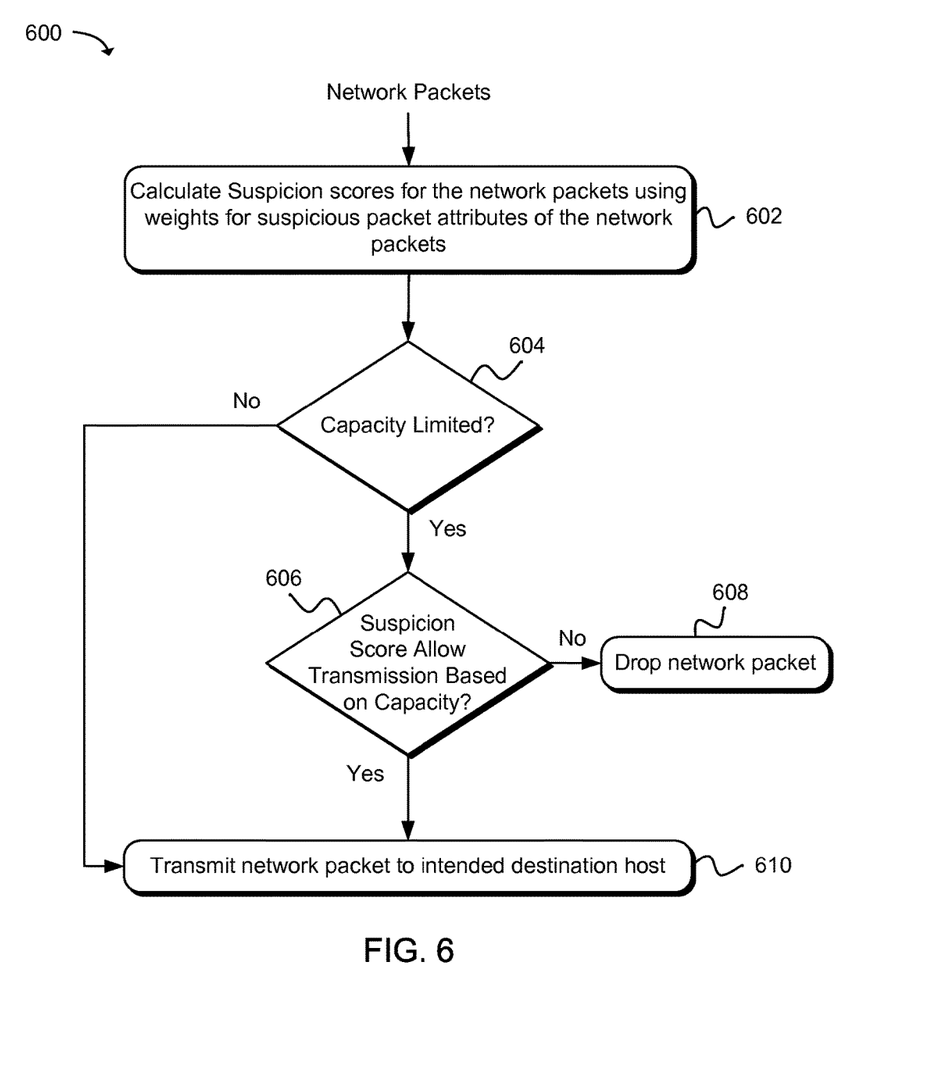
FIG. 6 is a flow diagram illustrating an example method for dropping low priority network packets as a result of limited network capacity.

FIG. 6 is a flow diagram illustrating an example of a method 600 for dropping lower priority network packets as a result of limited capacity. Starting in block 602, suspicion scores may be calculated for inbound network packets using preassigned weights for suspicious packet attributes. As described earlier, suspicious packet attributes may be packet attributes included in a header of a network packet that sometimes have a value that may be unexpected or suspicious, such as a sequence number that is set to zero, or a source IP address that is associated with a source host suspected of facilitating network attacks. The values of the suspicious packet attributes may be analyzed and suspicion weights associated with the suspicious packet attributes and values may be used to calculate a suspicion score for the network packet.

After assigning suspicion scores to the network packets, as in block 604, capacity (e.g., network bandwidth capacity) for a computer network used to transmit the network packets to destination hosts may be analyzed to determine capacity that may be available for transmitting network traffic associated with the network packets. In the case that available capacity is not limited, as in block 610, the network packets may be transmitted to the network packets' respective destination hosts. In the case that available capacity for the computer network is limited to a point that not all network packets can be transmitted to intended destination hosts (e.g., as the result of an occurring DDoS attack), as in block 606, the suspicion scores of the network packets may be used to deprioritize network packets having suspicion scores representing a lower priority as compared suspicion scores of the other network packets. Therefore, as in block 608, those network packets that have lower suspicion scores may be dropped due to the lack of capacity. Those network packets having higher suspicion scores may be transmitted to intended destination hosts, as in block 610.

As an alternative example, capacity for the computer network may be periodically analyzed (e.g., every few seconds, minutes, etc.) to determine an amount of available capacity that may be utilized for network traffic associated with inbound network packets. In the event that available capacity for the computer network becomes limited, suspicion scores may then be calculated for the inbound network packets, as in block 602, and the network packets may be deprioritized according to the available capacity, as in block 606.

Figure 7:
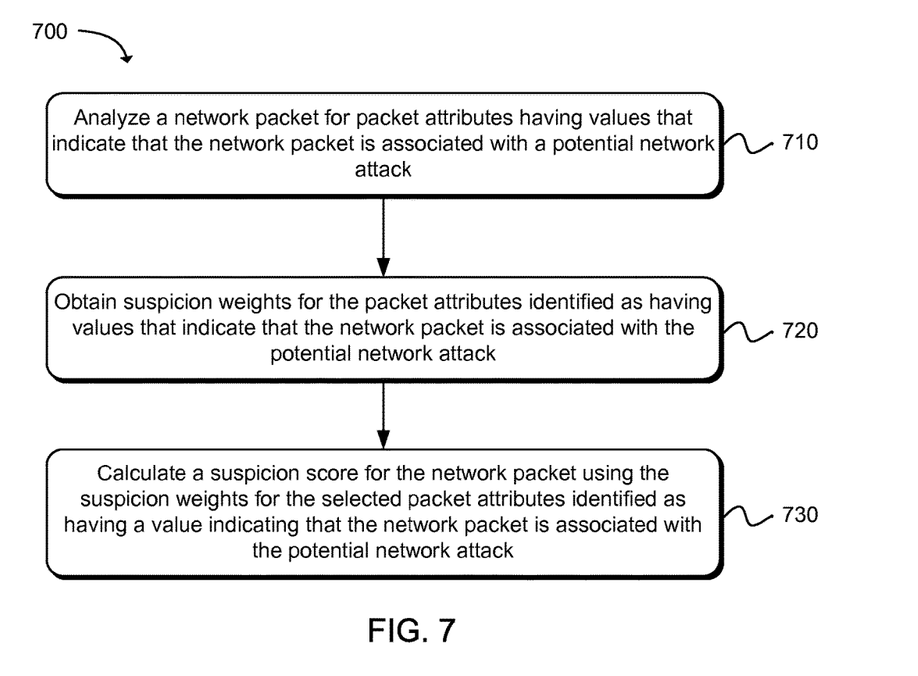
FIG. 7 is a flow diagram illustrating an example method for prioritizing network packets according to suspicion weights.

FIG. 7 is a flow diagram illustrating another example of a method 700 for prioritizing network packets according to suspicion weights. Beginning in block 710, a network packet may be analyzed for packet attributes having values that indicate that the network packet is associated with a potential network attack. In one example, the packet attributes that are analyzed may be predetermined by performing offline analysis of packet attributes included in the packet header to determine whether the packet attributes sometimes have values that indicate that the network packet may be associated with a potential network attack. For example, historical network packets may be analyzed to identify packet attributes that have suspicious values (e.g., atypical values for packet attributes, values associated with suspect source hosts, etc.). In another example, each packet attribute included in the packet header of a network packet may be analyzed for suspicious values. In addition, rather than performing the analysis offline, the packet attributes may be analyzed in production during operation on a real-time basis.

Suspicion weights may be predetermined for packet attributes according to the value of a packet attribute. For example, a suspicion weight may be assigned to a packet attribute having a suspicious value according to a likelihood that the suspicious value may be a result of the network packet having been constructed for use in an attack on a computer network. The assignment of the suspicion weight to the packet attribute and value may be stored in computer memory where the suspicion weight may be available to the method 700 that analyzes the network packets, as described below.

As in block 720, suspicion weights may be obtained for the packet attributes identified as having values that indicate that the network packet is associated with the potential network attack. For example, suspicion weights may be obtained from computer memory where a suspicion weight may be associated with a packet attribute and a value of the packet attribute. After obtaining the suspicion weights, as in block 730, a suspicion score may be calculated for the network packet using the suspicion weights for the selected packet attributes identified as having a value indicating that the network packet is associated with the potential network attack.

In the event that network bandwidth capacity for a computer network may be below a threshold or processing capacity for the computer network may be overloaded, network packets that have a suspicion score representing a lower priority as compared to suspicion scores for other network packets may be dropped from the computer network. For example, network traffic may be prioritized as a result of network bandwidth capacity for the computer network being overloaded, where network packets having a suspicion score representing a higher priority are transmitted to an intended destination host and network packets having a suspicion score representing a lower priority are dropped as a result of insufficient network bandwidth capacity.

Figure 8:
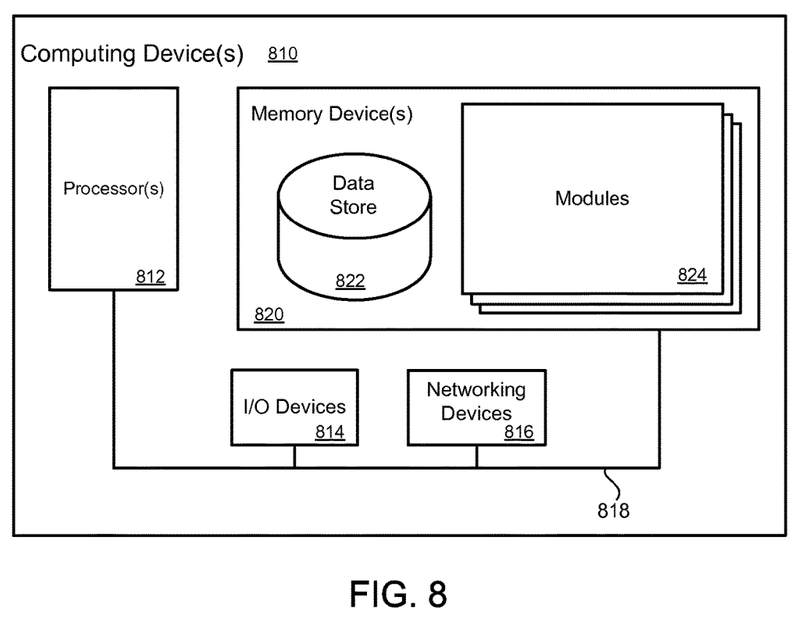
FIG. 8 is block diagram illustrating an example of a computing device that may be used to execute a method for prioritizing network packets using suspicion weights associated with packet attributes of the network packets.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 and services that are executable by the processor(s) 812 and data for the modules 824. The modules 824 and services may include a packet priority module, a traffic shaper module, as well as other modules and services. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
   analyze historical network packets to determine a number of occurrences of atypical values for selected packet attributes;
   identify a network packet intended for a destination host on a computer network;
   analyze a packet header for the network packet for a plurality of packet attributes having atypical values indicating that the network packet is associated with a potential attack on the computer network, wherein an atypical value for a packet attribute does not correspond to an expected value for the packet attribute and the atypical value complies with a communication protocol standard for the packet attribute;
   obtain suspicion weights assigned to the plurality of packet attributes that are identified as having the atypical values indicating that the network packet is associated with the potential attack on the computer network, wherein the suspicion weights are inversely proportional to the number of occurrences of the atypical values of the selected packet attributes in the historical network packets;

calculate a suspicion score for the network packet using the suspicion weights for the plurality of packet attributes that are identified as being associated with the potential attack;

determine network capacity for the computer network that the network packet is intended to travel through to reach the destination host; and determine whether to drop the network packet based, at least in part, on the network capacity for the computer network and the suspicion score for the network packet.

2. A non-transitory machine readable storage medium as in claim 1, wherein determining whether to drop the network packet further comprises, dropping the network packet based, at least in part, on the suspicion score representing a lower priority as compared to suspicion scores for other network packets.

3. A non-transitory machine readable storage medium as in claim 1, wherein instructions that when executed by the processor further analyze historical network packets to identify packet attributes having values that are associated with a computer network attack.

4. A computer implemented method, comprising:

analyzing historical network packets to determine an occurrence of packet attributes having atypical values;

analyzing a network packet for packet attributes having the atypical values that indicate that the network packet is associated with a potential network attack;

obtaining from computer memory a suspicion weight assigned to a packet attributes identified as having an atypical value that indicates that the network packet is associated with the potential network attack, wherein the suspicion weight is inversely proportional to a number of occurrences of the atypical value of the packet attribute in the historical network packets;

calculating a suspicion score for the network packet using the suspicion weights assigned to the packet attributes identified as having the atypical value indicating that the network packet is associated with the potential network attack; and determining whether to drop the network packet.

5. A method as in claim 4, further comprising dropping the network packet based, at least in part, on processing capacity for a computer network being below a threshold and the suspicion score for the network packet compared to suspicion scores for other network packets.

6. A method as in claim 4, further comprising dropping the network packet based, at least in part, on available network bandwidth capacity for a computer network being below a threshold and the suspicion score for the network packet compared to suspicion scores for other network packets.

7. A method as in claim 6, further comprising determining the available network bandwidth capacity by:

identifying an attribute of the network bandwidth capacity associated with a particular network packet type; and determining an amount of the network bandwidth capacity that is available to transmit network packets of the network packet type.

8. A method as in claim 4, wherein the packet attributes analyzed for a value indicating that the network packet is associated with a potential network attack are selected by analyzing historical network packets to identify packet attributes having suspicious values.

9. A method as in claim 4, further comprising:

analyzing historical network packets for packet attributes having suspicious values;

assigning a suspicion weight to a packet attribute having a suspicious value according to a probability of the suspicious score occurring; and storing the assignment of the suspicion weight to the packet attribute in the computer memory.

10. A method as in claim 4, further comprising determining a suspicion weight for a packet attribute by:

collecting a suspicion value history for network packets transmitted to a destination host during a time window comprising a current time to a time in the past;

analyzing the suspicion value history to determine an occurrence of a suspicious value for a packet attribute; and assigning a suspicion weight to the packet attribute according to the occurrence of the suspicious value.

11. A method as in claim 4, wherein calculating the suspicion score for the network packet using the suspicion weights assigned to the packet attributes further comprises, aggregating the suspicion weights assigned to the packet attributes identified as having a value that indicates that the network packet is associated with the network attack.

12. A method as in claim 4, further comprising prioritizing network traffic as a result of network bandwidth capacity for a computer network being below a threshold, wherein network packets having a suspicion score representing a higher priority are transmitted to an intended destination host and network packets having a suspicion score representing a lower priority are dropped.

13. A method as in claim 4, further comprising:

buffering a network packet having a suspicion score representing a lower priority based, at least in part, on network bandwidth capacity for a computer network being below a threshold; and transmitting the network packet to an intended destination host based, at least in part, on the network bandwidth capacity for the computer network increasing.

14. A method as in claim 4, wherein the values associated with the packet attributes are obtained from at least one packet header.

15. A method as in claim 4, wherein analyzing the network packet further comprises analyzing a network packet selected from: an IP packet, a TCP (Transmission Control Protocol) packet, a UDP (User Datagram Protocol) packet, an ICMP (Internet Control Message Protocol) packet, an HTTP (Hypertext Transfer Protocol) packet or a DNS (Domain Name System) packet.

16. A system comprising:

a processor;

a memory device including instructions that, when executed by the processor, cause the system to:

analyze historical network packets to determine an occurrence of atypical value formats for packet attributes;

identify a network packet intended for a destination host on a computer network;

analyze a plurality of packet attributes associated with the network packet for atypical value formats that indicate that the network packet is associated with a potential network attack;

obtain suspicion weights assigned to the plurality of packet attributes identified as having atypical value formats, wherein a packet attribute is assigned a higher suspicion weight as a result of the packet attribute having a lower occurrence of an atypical value or the packet attribute is assigned a lower suspicion weight as a result of the packet attribute having a higher occurrence of the atypical value;

calculate a suspicion score for the network packet using the suspicion weights; and determine whether to drop the network packet based, at least in part, on capacity for the computer network being below a threshold and the suspicion score for the network packet being higher as compared to suspicion scores for other network packets.

17. A system as in claim 16, wherein the memory device includes instructions that, when executed by the processor, causes the system to analyze historical network packets to identify the atypical value formats that are related to computer network attacks; and store the atypical value formats for use in analyzing the network packet for the atypical value formats.

18. A system as in claim 16, wherein the memory device includes instructions that, when executed by the processor, causes the system to assign a suspicion weight to an atypical value format according to a likelihood that the atypical value format is associated with an attack on a computer network.

19. A system as in claim 16, wherein the memory device includes instructions that, when executed by the processor, causes the system to calculate available network bandwidth capacity, wherein the network packet is dropped based, at least in part, on available network bandwidth capacity for the computer network being below a threshold and the suspicion score for the network packet representing a low priority as compared to suspicion scores for other network packets.

* * * * *